United States Patent

Johansson et al.

[11] Patent Number: 5,339,688
[45] Date of Patent: Aug. 23, 1994

[54] DEVICE FOR MEASURING A GAS FLOW, AND METHOD FOR USING THE DEVICE

[75] Inventors: Anders Johansson, Hovmantorp; Lennart Gustavsson, Växjö, both of Sweden

[73] Assignee: ABB Flakt AB, Nacka, Sweden

[21] Appl. No.: 98,404

[22] PCT Filed: Mar. 19, 1992

[86] PCT No.: PCT/SE92/00169
§ 371 Date: Aug. 13, 1993
§ 102(e) Date: Aug. 13, 1993

[87] PCT Pub. No.: WO92/16848
PCT Pub. Date: Oct. 1, 1992

[30] Foreign Application Priority Data

Mar. 22, 1991 [SE] Sweden ............... 9100867-2

[51] Int. Cl.⁵ .................................................. G01F 1/68
[52] U.S. Cl. ................................................... 73/204.22
[58] Field of Search ........... 13/204.16, 204.22, 204.25, 13/204.26, 204.27

[56] References Cited

U.S. PATENT DOCUMENTS

| | | |
|---|---|---|
| 1,996,943 | 9/1935 | Wile . |
| 2,924,972 | 2/1960 | Biermann . |
| 3,081,628 | 3/1963 | Salera . |
| 3,500,686 | 3/1970 | Bell, III . |
| 3,623,364 | 1/1971 | Withrow .............. 73/204.22 |
| 4,856,329 | 8/1989 | Buck et al. .......... 73/204.22 |

FOREIGN PATENT DOCUMENTS 3514491 11/1988 Fed. Rep. of Germany .
4003638 8/1990 Fed. Rep. of Germany .

*Primary Examiner*—Herbert Goldstein

[57] ABSTRACT

A device for measuring a gas flow (F) has a measuring body (1) in the form of a cylinder, and a heating device (12) for heating the measuring body. A slot (5) extends axially into the cylinder from one end thereof so as to divide a first portion of the cylinder into two symmetrical halves (6a, 6b). The heating device (12) is disposed in a second cylinder portion which is not divided by the slot (5). A temperature sensor (13) is arranged in the second cylinder portion, and a temperature sensor (14, 15) is arranged in each cylinder half (6a, 6b). For measuring a gas flow (F), the measuring body (1) is so disposed in the gas flow that the slot (5) extends at right angles to the gas flow with one half (6a) facing the gas flow and with the other half (6b) facing away from the gas flow. The measuring body (1) is heated by the heating device (12) to a temperature exceeding the ambient temperature by a predetermined value. The temperature is measured in each of the two symmetrical cylinder halves (6a, 6b), whereupon the gas flow is calculated on the basis of the measured temperatures.

3 Claims, 1 Drawing Sheet

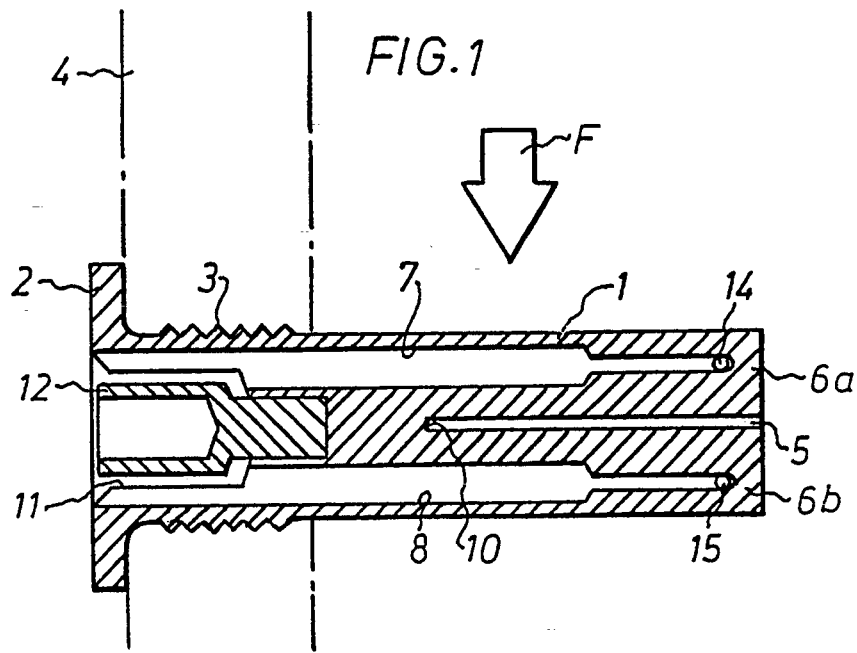
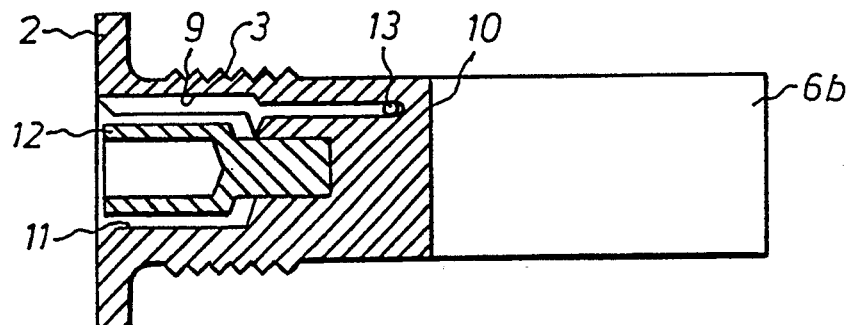
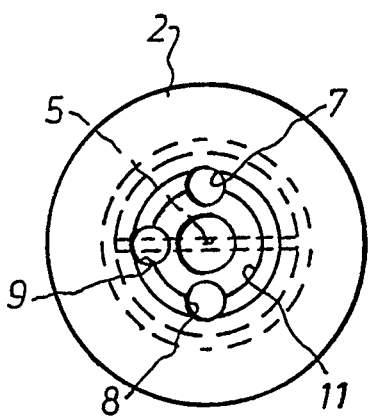
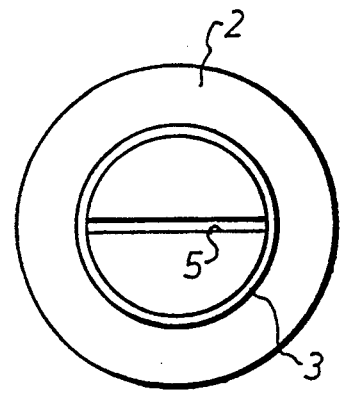

DEVICE FOR MEASURING A GAS FLOW, AND METHOD FOR USING THE DEVICE

FIELD OF THE INVENTION

The present invention relates to a device designed for measuring a gas flow and having a measuring body to be placed in the gas flow, and a heating means for heating the measuring body in relation to the environment. The invention also relates to a method for using the device.

DESCRIPTION OF THE BACKGROUND ART

A typical spray booth line for painting car bodies is divided into a plurality of successive sections which by means of fans are supplied with vertical supply air flows through filter roofs provided in the sections. In those sections where the car bodies are sprayed with paint, exhaust air flows polluted with paint particles and solvents are evacuated by means of fans. In order that polluted air should not spread horizontally from the spray sections to the other sections, it is vital that the horizontal air flows between the sections be directed towards the spray sections. It is also vital that the horizontal air flows be small in relation to the supply and exhaust air flows so as not to create secondary eddies in the spray sections or entail that paint particles are transferred from one car body to another. The horizontal air flows are suitably regulated by such a speed control of the supply air fans that the size and the direction of the horizontal air flows will become as desired. To permit carrying out this control in optimum fashion, the horizontal air flows must be accurately measured.

Thermal flow transducers, i.e. transducers having a measuring body which should be placed in the flow to be measured, and a means for heating the measuring body, and relying in different ways on the fact that the flow cools the heated measuring body, are known in various designs. However, none of the prior-art flow transducers can be considered to comply with the requirements 1-3 which are listed below and which must be placed on a flow transducer to be used in a spray booth line of the type described above.

1) Since a spray booth line is classified as explosive environment, the measuring body of the flow transducer may only be heated to a temperature which but insignificantly exceeds the ambient temperature.
2) The flow transducer must be relatively insensitive to deposits of paint and other chemicals on the measuring body.
3) The flow transducer must have a high sensitivity in the range around zero, especially in the range $-2$ m/s--$+2$ m/s.

SUMMARY OF THE INVENTION

The main object of the present invention is to provide a flow transducer meeting these requirements.

This object is achieved by means of a device which is of the type described by way of introduction and which according to the present invention is characterised in that the measuring body is in the form of a cylinder which is symmetrical with respect to a plane of symmetry extending through the axis of the cylinder, that a slot, containing said plane of symmetry, extends axially a certain distance into the cylinder from one end thereof, so as to divide a first portion of the cylinder into two halves which are symmetrical with respect to said slot, that the heating means is provided at a distance from the bottom of the slot in a second portion of the cylinder which is not divided by the slot, that a temperature sensor is provided in said second portion of the cylinder adjacent the bottom of the slot for measuring the temperature to which the measuring body is heated by the heating means, and that a temperature sensor is provided in each of the symmetrical cylinder halves adjacent said one end of the cylinder for measuring the temperature in the respective half.

The measuring body preferably is in the form of a straight circular cylinder.

Another object of the present invention is to provide a suitable method for using this device.

According to the invention, this object is achieved by a method which is characterised by so disposing the measuring body in the gas flow that the slot extends at right angles to the gas flow with one half facing the gas flow and with the other half facing away from the gas flow, heating the measuring body by the heating means to a temperature exceeding the ambient temperature by a predetermined value, measuring the temperature in each of the two symmetrical cylinder halves, and calculating the gas flow on the basis of the measured temperatures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail with reference to the accompanying drawings which are given by way of illustration only, and thus are not limitative of the present invention.

FIG. 1 is an axial longitudinal section of a measuring device according to the present invention.

FIG. 2 is an axial longitudinal section of the measuring device at right angles to the section in FIG. 1.

FIG. 3 is an end view showing the measuring device, with the heating means removed, from the left in FIG. 1.

FIG. 4 is an end view showing the measuring device from the right in FIG. 1.

DETAILED DESCRIPTION OF THE PREFERRED EMBODIMENTS

The measuring device shown in the drawing has a measuring body 1 formed as a single piece and consisting of brass. The measuring body 1 is in the form of a straight, circular cylinder which at one end has a circumferential flange 2 and a grooved portion 3 located inwardly of the flange. The flange 2 and the grooved portion 3 are used for fixing the device in a wall 4, through which the device extends into a gas flow F, e.g. an air flow, that is to be measured.

At its end opposite the flange 2, the measuring body 1 has a diametrical slot 5 extending axially from this end a certain distance into the measuring body 1. Thus, the slot 5 divides a portion of the cylinder into two similar halves 6a and 6b. As seen in FIG. 1, the measuring body 1 is so disposed in the gas flow F that the slot 5 will extend at right angles to the gas flow, with one cylinder half 6a facing the gas flow and with the other cylinder half 6b facing away from the gas flow.

Three axially directed shoulder bores 7, 8 and 9, whose center lines are located at the same distance from the axis of the cylinder and offset 90° with respect to each other (see FIG. 3), extend into the measuring body 1 from its flanged end. The shoulder bores 7 and 8 are located diametrically opposite each other, and the connecting line between their center lines is perpendicular to the slot 5 (see FIG. 3). The shoulder bores 7 and 8 each extend equally far into one cylinder half 6a and 6b, respectively, to a position just inside the slotted end of the measuring body 1. The shoulder bore 9 is located opposite the slot 5 (see FIG. 3). However, it does not extend as far as the slot, but ends a short distance from the bottom 10 of the slot (see FIG. 2).

A shoulder bore 11 extends along the axis of the cylinder some distance into the measuring body 1 from the flanged end thereof. The inner, narrower portion of the bore 11 is threaded (not shown). A heating means 12 is screwed into the shoulder bore 11 and, additionally, is fixed therein by means of an epoxy glue having good thermal conductivity. The heating means 12, containing a heating resistor (not shown), is adapted to heat the measuring body 1 to a temperature exceeding the ambient temperature by a predetermined, relatively low value, e.g. 10° C.

The temperature of the measuring body 1 is measured by means of a temperature sensor 13 disposed at the bottom of the shoulder bore 9. In this case, the temperature sensor 13 is a resistance thermometer with a platinum resistance wire having a resistance of 100 Ω at 0° C.

The temperature of the two cylinder halves 6a and 6b is measured by means of two temperature sensors 14 and 15 disposed at the bottom of the shoulder bores 7 and 8, respectively. Each of the temperature sensors 14 and 15 here consists of two resistance thermometers, each having a platinum resistance wire of a resistance of 100 Ω at 0° C.

The shoulder bores 7, 8 and 9 are filled with epoxy glue having good thermal conductivity. The four resistance thermometers in the temperature sensors 14 and 15 are connected in a measuring bridge via connecting wires (not shown) running from the sensors to the outside of the measuring body 1 via the epoxy Glue in the shoulder bores 7 and 8. The connecting wires (not shown) of the temperature sensor 13 similarly run from the sensor to the outside of the measuring body 1 via the epoxy Glue in the bore 9.

When the measuring device is to be used, the measuring body 1 is placed in the gas flow F in the manner shown in FIG. 1. The measuring body 1 is heated to a temperature which is 10° C. above the ambient temperature, which is measured by a separate temperature transducer. The gas flow F cools the measuring body 1, the cylinder half 6a facing the gas flow F being cooled to a greater extent than the other cylinder half 6b. The temperature difference between the two cylinder halves 6a and 6b is measured by means of the temperature sensors 14 and 15, whereupon the Gas flow is calculated on the basis of the measured temperature difference.

Theoretically, this temperature difference dT is a function of several parameters:

$$dT = f(\alpha A1/KA2, Q, T)$$

where $\alpha$ is the coefficient of heat transfer between the measuring body 1 and the gas, K is the heat conductivity of the measuring body 1, A1 is the area of the circumferential surface of the portion of the measuring body 1 through which the slot 5 extends, A2 is the cross-sectional area of the measuring body 1, Q is the gas flow, and T is the difference between the temperature of the measuring body 1 and the ambient temperature. dT is proportional to $\alpha A1/KA2$. Since $A1 = \pi \cdot d \cdot L$, where d is the diameter of the measuring body 1 and L is the depth or axial length of the slot 5, and $A2 = \pi d^2/4$, it is possible in actual practice to increase the sensitivity of the measuring device by increasing, within certain limits, the depth L of the slot 5 and/or decreasing the diameter d of the measuring body 1.

The invention is not restricted to the embodiment described above, but may be modified in several different ways within the scope of the accompanying claims. For instance, the measuring body is not necessarily a straight, circular cylinder, but may be a cylinder otherwise designed. However, the cylinder should be symmetrical with respect to a plane of symmetry extending through the axis of the cylinder, such that the slot can divide a portion of the cylinder into two halves which are symmetrical with respect to the slot.

We claim:

1. A device designed for measuring a gas flow comprising a measuring body to be placed in the gas flow, heating means for heating the measuring body in relation to the environment, the measuring body in the form of a cylinder which is symmetrical with respect to a plane of symmetry extending through the axis of the cylinder, a slot containing said plane of symmetry and extending axially a certain distance into the cylinder from one end thereof, so as to divide a first portion of the cylinder into two halves which are symmetrical with respect to said slot the heating means at a distance from the bottom of the slot in a second portion of the cylinder which is not divided by the slot a temperature sensor in said second portion of the cylinder adjacent the bottom of the slot for measuring the temperature to which the measuring body is heated by the heating means, and that a temperature sensor in each of the symmetrical cylinder halves adjacent said one end of the cylinder for measuring the temperature in the respective half.

2. Device as claimed in claim 1, wherein the measuring body is in the form of a straight circular cylinder.

3. A method for using the device as claimed in claim 1 for measuring a gas flow, comprising: disposing the measuring body in the gas flow so that the slot extends at right angles to the gas flow with one half facing the gas flow and with the other half facing away from the gas flow, heating the measuring body by the heating means to a temperature exceeding the ambient temperature by a predetermined value, measuring the temperature in each of the two symmetrical cylinder halves, and calculating the gas flow on the basis of the measured temperatures.

* * * * *